(12) United States Patent
Kobozev et al.

(10) Patent No.: US 7,702,899 B2
(45) Date of Patent: *Apr. 20, 2010

(54) METHOD AND APPARATUS FOR VERIFYING REVOCATION STATUS OF A DIGITAL CERTIFICATE

(75) Inventors: Alexey Kobozev, Rishon LeZion (IL); Arthur Zavalkovsky, Netanya (IL); Ilan Frenkel, Tel-Aviv (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/356,777

(22) Filed: Jan. 21, 2009

(65) Prior Publication Data

US 2009/0132812 A1    May 21, 2009

Related U.S. Application Data

(63) Continuation of application No. 10/660,413, filed on Sep. 10, 2003, now Pat. No. 7,500,100.

(51) Int. Cl.
*H04L 9/00* (2006.01)

(52) U.S. Cl. .................. 713/150; 713/156; 713/158; 713/168

(58) Field of Classification Search ......... 713/155–158, 713/168–170, 173, 175–176, 178, 180, 150; 380/277, 282, 285
See application file for complete search history.

(56) References Cited

U.S. PATENT DOCUMENTS 6,223,291 B1 *   4/2001   Puhl et al. ..................... 726/28
7,500,100 B1 *   3/2009   Kobozev et al. ............. 713/168

* cited by examiner

*Primary Examiner*—Hosuk Song
(74) *Attorney, Agent, or Firm*—Hickman Palermo Truong & Becker LLP

(57) ABSTRACT

Verifying revocation status of a digital certificate is provided in part by a receiver verifying a security certificate for a sender. In an embodiment, an approach comprises receiving a first security certificate associated with the sender and storing the security certificate in a location accessible to the receiver; updating the first security certificate in the location accessible to the receiver if the first security certificate is changed or revoked; receiving a second security certificate from the sender when identity of the sender needs to be verified; comparing the second security certificate to the first security certificate; and confirming the sender's identity only if the second security certificate matches the first security certificate for the sender.

22 Claims, 8 Drawing Sheets

METHOD AND APPARATUS FOR VERIFYING REVOCATION STATUS OF A DIGITAL CERTIFICATE

BENEFIT CLAIM; CROSS-REFERENCE TO RELATED APPLICATIONS

This application claims the benefit under 35 U.S.C. 120 as a Continuation of prior application Ser. No. 10/660,413, filed Sep. 10, 2003, now U.S. Pat. No. 7,500,100 the entire contents of which are hereby incorporated by reference for all purposes as if fully set forth herein.

TECHNICAL FIELD

The present invention relates to network communication using computers and digital certificates. The invention specifically relates to a method and apparatus for verifying revocation status of a digital certificate.

BACKGROUND

Digital certificates, also known as security certificates or simply "certificates", utilize public keys and private keys to facilitate secure and validated transport of messages and information among people, computers, and servers. Digital certificates automate the process of distributing public keys and exchanging secure information. The digital certificate on a computer, server, web site, etc. has a public key that is freely available as part of the digital certificate and is given to those who wish to communicate with the device, who in turn use the key to encrypt messages sent to the certificate owner. The certificate owner also has its own private key that it uses to decrypt incoming messages.

Consider this example of communication using digital certificates. Whenever device A wishes to exchange information with device B, A accesses B's digital certificate, which contains B's public key. Then, A uses B's public key to validate B's identity and to encrypt the information to be sent. Only B's private key can decrypt this information once it is encrypted with B's public key.

In general, when a first device checks the identity of a second device against the identity conveyed by its certificate, the first device can be assured that the identity conveyed by the certificate of the second device is true and valid. However, if the certificate is invalid, because it has been stolen or otherwise counterfeited, then the identity of the second device can be falsified.

Once certificates are known to be compromised, they are revoked and added to the certificate authority's (CA) certificate revocation list (CRL). Given the potential for certificates to be compromised, it is important that those who receive messages, or otherwise need to verify identities, have a means for checking the validity of certificates. For example, if a rogue process counterfeits a server's certificate, a client might be duped into accepting this rouge server as a true server, and pass confidential credential information to the rouge server. Similarly, if a server is shown a counterfeit certificate from a client that it cannot determine to be invalid, it may give inappropriate access to this client.

In client-server systems, such as authentication, authorization, and accounting (AAA) client-server systems, digital certificates are used to verify the identity and validity of the clients and servers. This process typically involves four steps: validating the certificate using the trusted CA's public key, validating that the sender of the certificate is the owner of the private key, comparing the certificate content and the identity of the certificate sender, and checking the validity of the certificate.

Consider for example, a client verifying the identity of a server. In order to validate the server's certificate using the CA, the server first sends the client its certificate signed by the CA. Then, the client (e.g., a web browser) uses the public key of the CA to decrypt the certificate and thereby verify that the certificate has been encrypted using the CA's private key, which is held exclusively by the CA. If the decryption is successful, the client has verified that the CA has signed the certificate.

In order to validate that a server is the true owner of the private key, the server first encrypts a message using its private key and sends it to the client. Then, the client decrypts that data with the server's public key carried by the server's certificate. If the decryption is successful, the client has verified that the server truly holds the correspondent private key.

In order to compare the certificate content and the identity of the certificate sender, the client verifies that the certificate subject name contains the identity (e.g. domain name) of the server.

There are a number of possible ways to check the validity of the certificates. One set of solutions use the CA's CRLs to validate certificates. Such approaches are deficient in a number of ways. First, an interval for obtaining the CRL must be established. Consider a message passed at time T. If the interval for obtaining the CRL is based on passage of time, then, the longer the interval, the higher the probability that a certificate will be revoked between time T and the time when the CRL was last received. Conversely, if the interval is shorter, then the probability of missing a certificate revocation decreases, but not to zero, and the load on the network and on the CA increase unreasonably.

Another approach is to obtain either a CRL from the CA each time a certificate needs to be checked or to use the Online Certificate Status Protocol (OCSP) in order to obtain the information about that particular certificate. Both of these solutions require real-time interaction with the CA for each message validation at every client and server and would thereby unreasonably burden the CA and the network.

None of the above approaches adequately solve the problem of verifying the revocation status of a certificate.

Another problem with approaches to verify digital certificates deals with the multitude of formats that must be supported in a single system. In many approaches, it is required, when verifying a certificate, to know how to parse certificates in the incoming formats and to know which fields to compare. The fields can be as simple as name, location, and validity dates, but can also be specific uses of optional fields and, therefore, implementation dependent. The need to prepare for all of the permutations and possibilities related to certificate formats and uses increases the burden on and the expertise needed by the system administrators and implementers and increases the complexity of the code needed to implement the system.

There are many examples of authentication schemes such as those described above, including the 802.1x authentication scheme. The Protected Extensible Authentication Protocol (PEAP) and the Extensible Authentication Protocol/Transport Level Security protocol (EAP-TLS) also involve verification and validation of the client's and the AAA server's certificates. In the EAP-TLS and PEAP cases clients often cannot choose the AAA server with which to be authenticated. Therefore, the client should verify that it can trust the AAA server by examining server's certificate.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
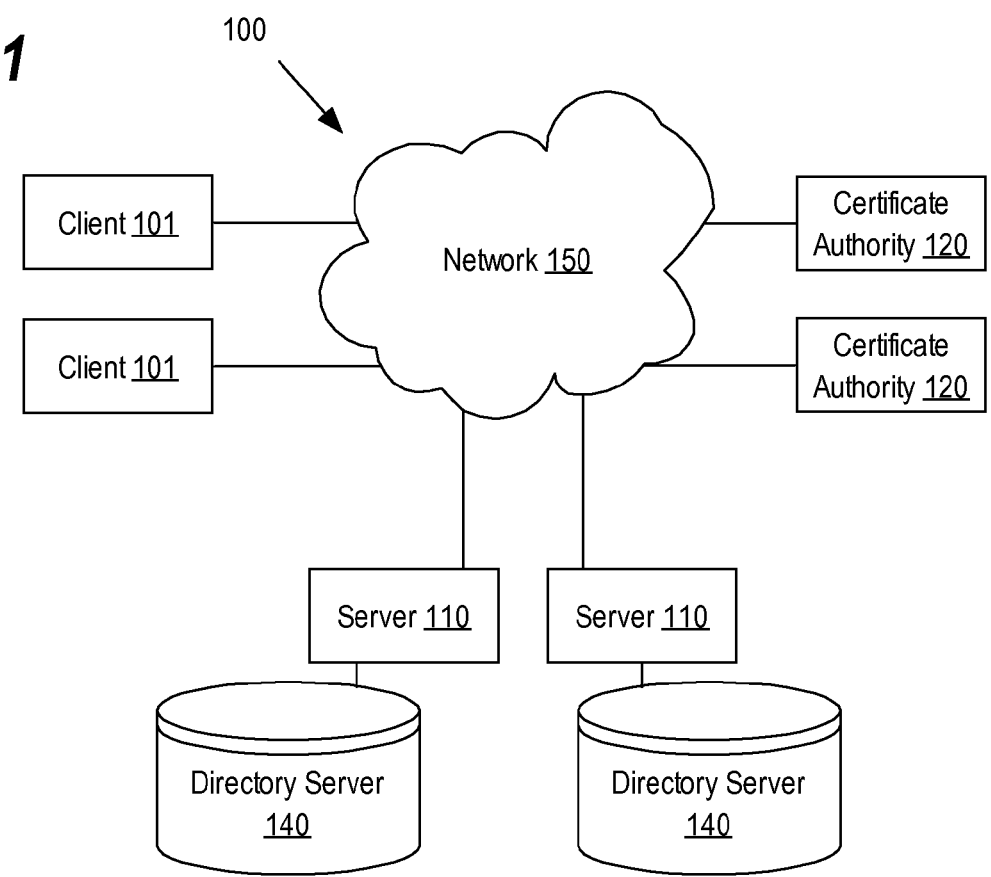
FIG. 1 is a block diagram that depicts a system for communication among clients and servers using an embodiment of the current invention.

A method and apparatus for verifying revocation status of a digital certificate is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Generally, all of the solutions described herein could be embodied by any entity, any receiver, that would like to verify the revocation status of a certificate for a potential communication partner, a sender. In such embodiments the names "sender" and "receiver" are used simply to differentiate the two entities. In various embodiments, each of the sender and receiver could be on either end of a communication channel, could be either client or server, and could be any other appropriate entities which need to verify the revocation status of a certificate belonging to the other. In various embodiments it is also possible that a single entity is both sender and receiver for a partner entity. It various embodiments it is also possible that a single entity could be sender and/or receiver for a plurality of other entities.

General Overview

The needs identified in the foregoing Background, and other needs and objects that will become apparent for the following description, are achieved in the present invention, which comprises, in one aspect, techniques for a receiver to verify a security certificate for a sender including the steps of: receiving a first security certificate associated with the sender and storing the security certificate in a location accessible to the receiver; updating the first security certificate in the location accessible to the receiver if the first security certificate is changed or revoked; receiving a second security certificate from the sender when identity of the sender needs to be verified; comparing the second security certificate to the first security certificate; and confirming the sender's identity only if the second security certificate matches the first security certificate for the sender.

In a related feature, updating the first security certificate includes removing the certificate from the location accessible to the receiver if the first certificate is revoked and replacing the first certificate in the location accessible to the receiver if the first certificate is changed.

In a related feature, removing or changing the first certificate from the location accessible to the receiver is performed if the first certificate is known to have been revoked or changed for a reason such as expiration of the certificate, change of certificate authority, and compromise of the certificate.

In a related feature, the first certificate is stored in a directory service such as a Lightweight Directory Access Protocol directory. In a related feature, the first certificate is known to have been granted by a certificate authority. In a related feature, the first certificate is known to have been obtained in a trusted domain. In a related feature, comparing the first certificate and the second certificate includes comparing a computer memory representation of each certificate.

In a related feature, the sender is a client and the receiver is a server. In a related feature, the receiver is an authentication, authorization, and accounting server. In a related feature, the sender is a server and the receiver is a client.

In a related feature, the communication between the sender and receiver is in a protocol that requires the inclusion of a digital certificate. In another related feature of the invention, the protocol one of the following: the Extensible Authentication Protocol and Transport Level Security protocol, the Protected Extensible Authentication Protocol, and the Tunneled Transport Level Security protocol.

In a related feature, the second certificate received from the sender is known to have been signed by a certificate authority.

In a related feature, the steps involved further include decrypting the second certificate using a public key associated with the certificate authority. This allows the receiver to verify that the certificate authority has signed the second certificate.

In a related feature, the steps further include validating that the sender has a private key corresponding to a public key in the second certificate. This is accomplished with the steps of receiving a message encrypted with the sender's private key and decrypting the message using the sender's public key.

In another aspect, Techniques are provided for a server to verify a security certificate for a client comprising the steps of copying a first certificate associated with the client to a location accessible to the server; updating the first security certificate in the location accessible to the server if the certificate is changed or revoked; receiving a second security certificate from the client when identity of the client needs to be verified; comparing the second security certificate to the first security certificate; and confirming the client's identity only if the second security certificate matches the first security certificate.

In a related feature, updating the first certificate includes removing the first certificate from the location accessible to the server if the first certificate is revoked; and replacing the first certificate in the location accessible to the server if the first certificate is changed.

In a related feature, the first certificate is known to have been revoked or changed for one of the following reasons: expiration of the certificate, change of certificate authority, and compromise of the certificate. In a related feature, the location accessible to the server is a Lightweight Directory Access Protocol directory.

In a related feature, the first certificate is known to have been granted by a certificate authority. In a related feature, the first certificate is known to have been obtained in a trusted domain. In a related feature, the server is an authentication, authorization, and accounting server. In a related feature, the step of comparing the first certificate and second certificate comprises comparing a computer memory representation of each certificate.

In a related feature, the communication between the client and server is in a protocol that requires the inclusion of a digital certificate. In a related feature, the communication between the client and server is in a protocol that is among the following group: the Extensible Authentication Protocol and Transport Level Security protocol, the Protected Extensible Authentication Protocol, and the Tunneled Transport Level Security protocol. In a related feature, the second certificate is known to have been signed by a certificate authority.

In a related feature, a further step is included, that step being decrypting the second certificate using a public key associated with the certificate authority. This allows the server to verify that the certificate authority has signed the second certificate.

In a related feature, a further step is included, that step being validating that the client has a private key corresponding to a public key in the second security certificate. This step including steps of receiving a message encrypted with the client's private key and decrypting the message using the client's public key.

In a related aspect, techniques are provided for a client to verify a security certificate for a server including the steps of receiving a first security certificate associated with the server and storing the first security certificate in a location accessible to the client; updating the first security certificate in the location accessible to the client if the first security certificate is changed or revoked; receiving a second security certificate from the server when identity of the server needs to be verified; comparing the second security certificate to the first security certificate; and confirming the server's identity only if the second security certificate matches the first security certificate for the server.

In a related feature, the step of updating the first certificate comprises removing the first certificate from the location accessible to the client if the first certificate is revoked; and replacing the first certificate in the location accessible to the client if the first certificate is changed.

In a related feature, the first certificate is removed or changed if the first certificate is known to have been revoked or changed for a reason selected from the group consisting of expiration of the certificate, change of certificate authority, and compromise of the certificate.

In a related feature, step of comparing the two certificates comprises comparing a computer memory representation of each certificate. In a related feature, the server is an authentication, authorization, and accounting server. In a related feature, the communication between the client and server is in a protocol that requires the inclusion of a digital certificate.

In a related feature, the communication between the client and server is in a protocol that is selected from the group consisting of the Extensible Authentication Protocol and Transport Level Security protocol, the Protected Extensible Authentication Protocol, and the Tunneled Transport Level Security protocol. In a related feature, the second certificate is known to have been signed by a certificate authority.

In a related feature, the technique further includes the step of decrypting the second certificate using a public key associated with the certificate authority. This allows the client to verify that the certificate authority has signed the second certificate. In a related feature, the server is one of a plurality of load balanced servers and the each server of the plurality has an identical security certificate. This enables the client to not need to know to which of the plurality of servers it is attached.

In a related feature, the technique further includes the step of validating that the sender has a private key corresponding to a public key in server's security certificate. This extra step comprising the steps of receiving a message encrypted with the server's private key and decrypting the message using the server's public key.

In a related aspect, techniques are provided for a computer-readable medium carrying one or more sequences of instructions which, when executed by one or more processors, causes the one or more processors to perform the steps of receiving a first security certificate associated with the sender and storing the security certificate in a location accessible to the receiver; updating the first security certificate in the location accessible to the receiver if the first security certificate is changed or revoked; receiving a second security certificate from the sender when identity of the sender needs to be verified; comparing the second security certificate to the first security certificate; and confirming the sender's identity only if the second security certificate matches the first security certificate for the sender.

In a related aspect, techniques are provided for a system comprising a local area network; and two or more devices communicatively coupled to the local area network; wherein one or more of the devices are configured to perform the steps of receiving a first security certificate associated with the sender and storing the security certificate in a location accessible to the receiver; updating the first security certificate in the location accessible to the receiver if the first security certificate is changed or revoked; receiving a second security certificate from the sender when identity of the sender needs to be verified; comparing the second security certificate to the first security certificate; and confirming the sender's identity only if the second security certificate matches the first security certificate for the sender; and one or more of the devices are configured to perform the steps of: copying the first certificate to a location accessible to the sender; updating the first certificate if the certificate is changed or revoked; and sending the first certificate to a receiver when communication between the sender and receiver is attempted.

System Overview

FIG. 1 is a block diagram that depicts a system for communication among clients and servers using an embodiment of the current invention.

System 100 includes a network 150, one or more clients 101 communicatively coupled to the network 150, one or more servers 110 communicatively coupled to the network 150, one or more directory servers 140 communicatively coupled to the servers 110, and one or more certificate authorities 120. In various embodiments, network 150 is a wireless network, dial up access, the Internet, a local area network (LAN), or any other communication network. In certain embodiments, network 150 includes zero or more network devices, access points, routers, and other means for facilitating communication among the entities communicatively coupled to the network. The servers 110 are implemented as AAA servers 110 or any other type of server 110. The clients 101 are implemented as authentication, authorization, and accounting clients 101 or any other type of client 101. The directory servers 140 are Lightweight Directory Access Protocol (LDAP) directories or any other type of storage appropriate for a particular embodiment.

Server Authenticating Client

Figure 2:
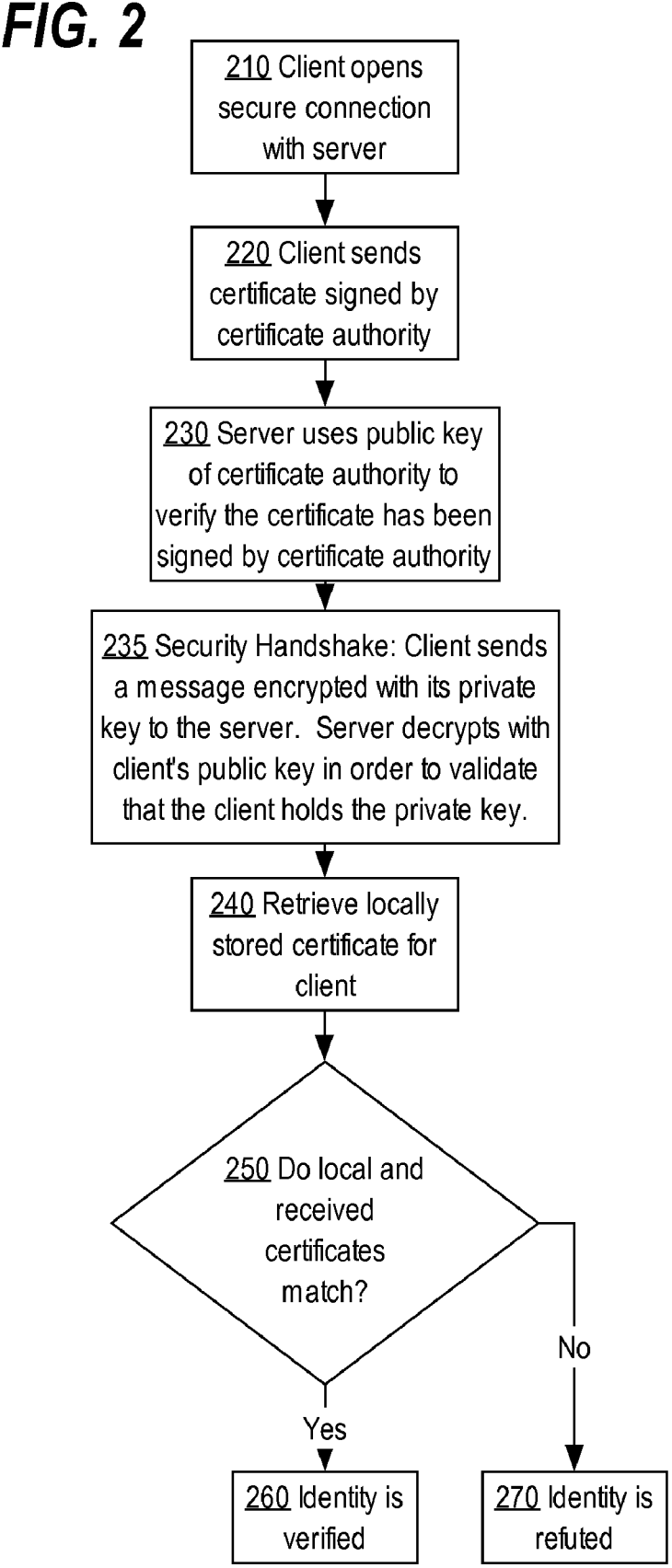
FIG. 2 is a flow diagram that depicts a process for server authentication of a client.

FIG. 2 is a flow diagram that depicts a process for server authentication of a client. For purposes of illustrating a clear example, the process of FIG. 2 is described below with reference to the example system of FIG. 1. However, FIG. 2 may be practiced using any other suitable network system.

In the context of FIG. 1, the process of FIG. 2 may involve a server 110 verifying the identity and non-revocation of the client's 101 certificate. In block 210, a client opens a secure connection to a server. For example, client 101 opens an https connection with server 110.

In block 220, a client sends a certificate signed by a CA to a server. For example, a client 101 sends a certificate to a server 110 that has been signed by a certificate authority 120. In alternative embodiments, the client's certificate is not be signed by a CA.

In block 230, a server uses the public key of the CA to verify a client's certificate has been signed by the CA. In various embodiments, this involves the server decrypting the client's certificate using the CA's public key. In other various embodiments, this involves the server decrypting a small portion of the client's certificate using the CA's public key. For example, a server 110 could use a public key of a CA 120 in order to determine whether the CA 120 has in fact signed the certificate of a client 101.

In block 235, a client and a server engage in a security handshake. Here a client sends a message encrypted with its private key to the server. The server then decrypts the message with the client's public key in order to validate that the client holds the private key. An example of such a security handshake is the Secure Socket Layer (SSL) handshake performed as part of the SSL protocol. For example, a client 101 that has opened an https connection with a server 110 performs a SSL handshake as part of its connection protocol. In doing so, the client 101, would send and encrypted message (using its private key) to a server 110. The server 110 would then decrypt the message using the client's 101 private key. In alternative embodiments, this secure handshake step is omitted.

In block 240, a server retrieves a locally stored certificate for a client. For example, a server 110 could look up in its directory server 140 the certificate stored for a certain client 101.

In block 250, a server compares the certificate from the client and the one from the directory service. In various embodiments, this is accomplished by doing a bit-by-bit comparison of the two certificates. In other various embodiments, this is accomplished by comparing particular fields within the two certificates. For example, a server 110, could perform a comparison of a certificate it has received from a client 101 and the certificate from the directory service 140 that corresponds to that client 101 using a bit-by-bit comparison of the two certificates.

If, upon comparing the two certificates, they match, then the identity of the client is confirmed, block 260. Otherwise the client's identity is refuted, block 270; and the message should be refused, ignored, or otherwise handled appropriately. For example, if a server 110 finds that the certificate received from a client 101 and the certificate associated with the client 101 from the directory service 140 match, then the identity of the client 101 is confirmed, block 260. Otherwise the identity of the client 101, is refuted, block 270, and communication with the client 101 is terminated.

The steps described along with the associated steps described herein overcome the problem of obtaining updated status for a client's certificate when communication is attempted between a server and a client.

Client Authenticating Server

Figure 3:
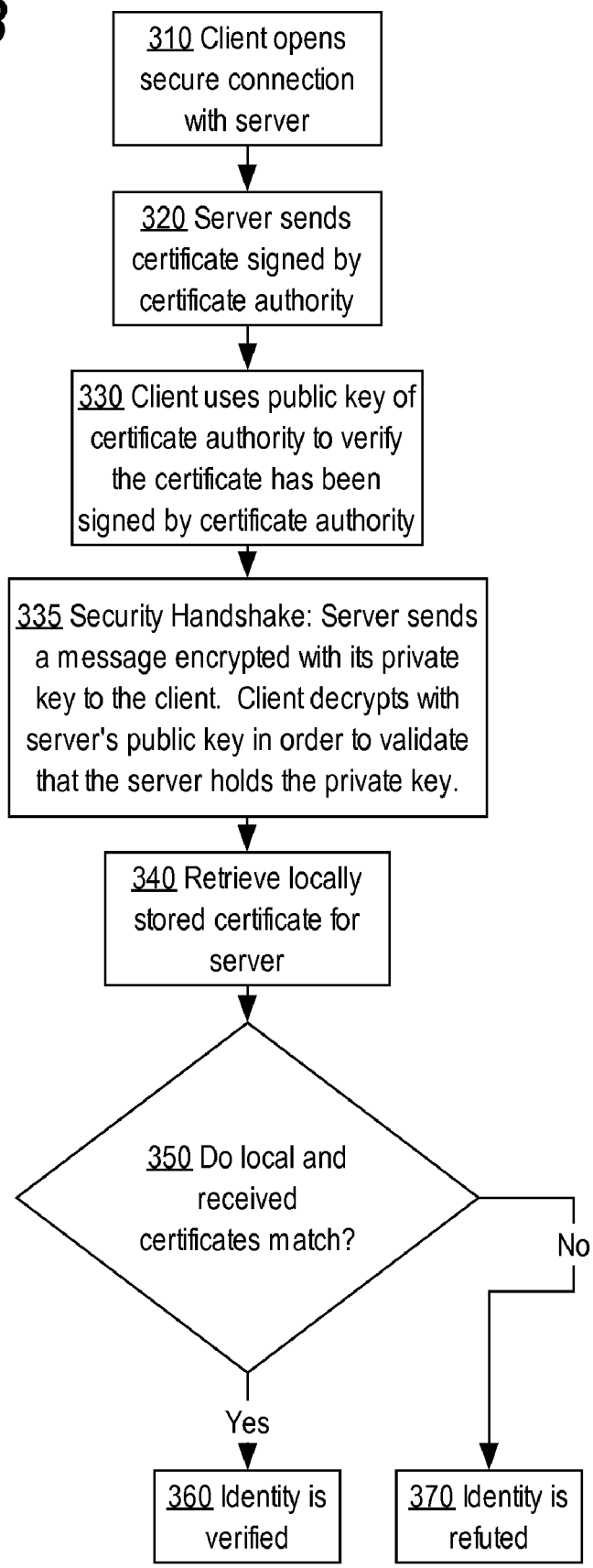
FIG. 3 is a flow diagram that depicts a process for client authentication of a server.

FIG. 3 is a flow diagram that depicts a process for client authentication of a server. For purposes of illustrating a clear example, the process of FIG. 3 is described below with reference to the example system of FIG. 1. However, FIG. 3 may be practiced using any other suitable network system.

In the context of FIG. 1, the process of FIG. 3 may involve a client 101 verifying the identity and non-revocation of the server's 110 certificate. In block 310, a client opens a secure connection to a server. For example, client 101 opens an https connection with server 110.

In block 320, a server sends a certificate signed by a CA to a client. For example, a server 110 sends a certificate to a client 101 that has been signed by a certificate authority 120. In alternative embodiments, the client's certificate is not be signed by a CA.

In block 330, a client uses the public key of the CA to verify a server's certificate has been signed by the CA. In various embodiments, this involves the client decrypting the server's certificate using the CA's public key. In other various embodiments, this involves the client decrypting a small portion of the server's certificate using the CA's public key. For example, a client 101 could use a public key of a CA 120 in order to determine whether the CA 120 has in fact signed the certificate of a server 110.

In block 335, a client and a server engage in a security handshake. Here a server sends a message encrypted with its private key to the client. The client then decrypts the message with the server's public key in order to validate that the server holds the private key. An example of such a security handshake is the Secure Socket Layer (SSL) handshake performed as part of the SSL protocol. For example, a client 101 that has opened an https connection with a server 110 performs a SSL handshake as part of its connection protocol. In doing so, the server 110, would send and encrypted message (using its private key) to a client 101. The client 101 would then decrypt the message using the server's 110 private key. In alternative embodiments, this secure handshake step is omitted.

In block 340, a client retrieves a locally stored certificate for a server. For example, a client 101 could retrieve the certificate stored for a certain server 110.

In block 350, a client compares the certificate from the server and the one stored locally. In various embodiments, this is accomplished by doing a bit-by-bit comparison of the two certificates. In other various embodiments, this is accomplished by comparing particular fields within the two certificates. For example, a client 101, could perform a comparison of a certificate it has received from a server 110 and the certificate retrieved from local storage that corresponds to that server 110 using a bit-by-bit comparison of the two certificates.

If, upon comparing the two certificates, they match, then the identity of the server is confirmed, block 360. Otherwise the server's identity is refuted, block 370; and the message should be refused, ignored, or otherwise handled appropriately. For example, if a client 101 finds that the certificate received from a server 110 and the certificate associated with the server 110 retrieved from local storage match, then the identity of the server 110 is confirmed, block 360. Otherwise the identity of the server 110, is refuted, block 370, and communication with the server 110 is terminated.

The steps described along with the associated steps described herewithin overcome the problem of obtaining updated status for a server's certificate when communication is attempted between a server and a client.

Communication Protocols

Various embodiments implement protocols that allow authentication with or communication of certificates. Some of the commonly used protocols include Protected Extensible Authentication Protocol, Extensible Authentication Protocol/Transport Level Security, and Tunneled Transport Layer Security (TTLS).

Updating the Server Certificate

There are many reasons that a certificate could be revoked for a server, including, expiration of the certificate, change of certificate authority, and compromise of the certificate. In any of these cases, the certificate needs to be replaced, as do the copies of the certificate resident on the clients.

Figure 4:
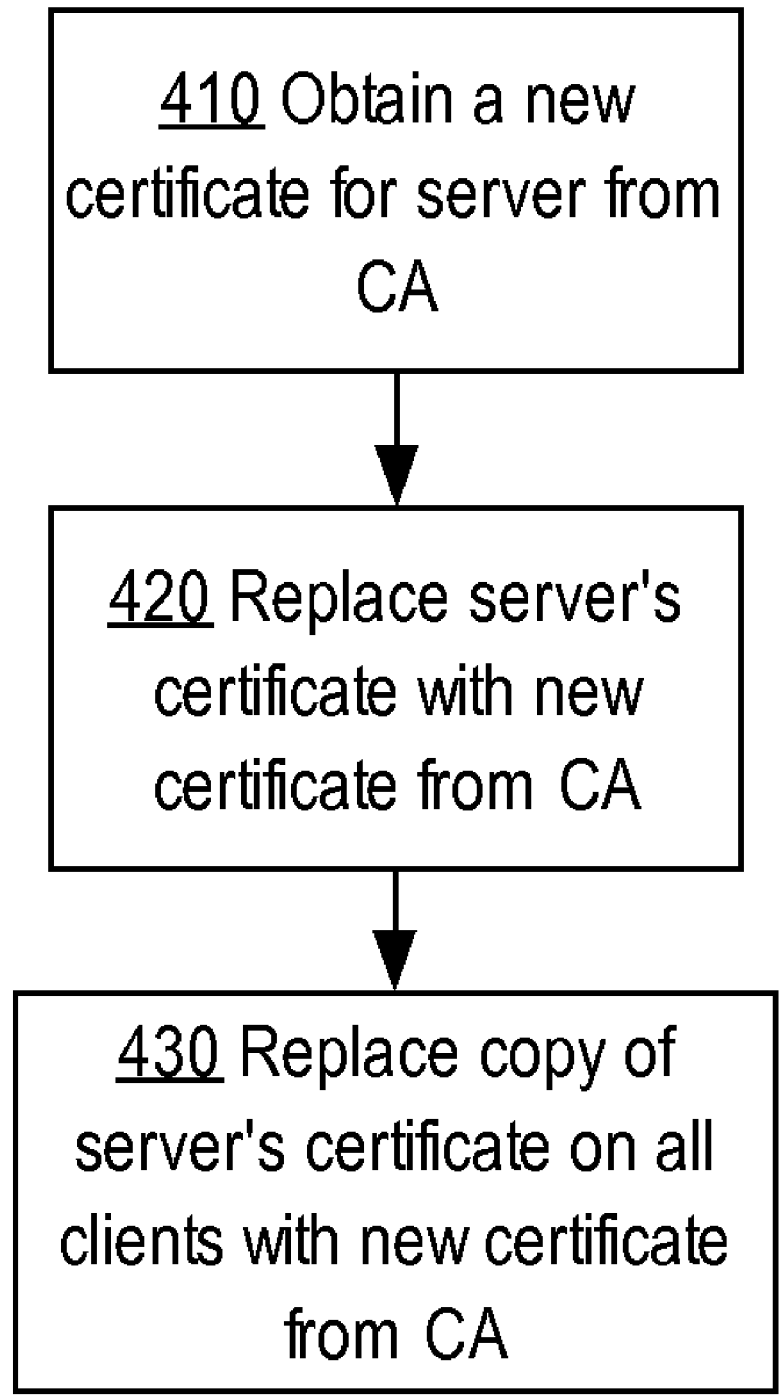
FIG. 4 is a flow diagram that depicts a process for replacing the certificate for a server.

FIG. 4 is a flow diagram that depicts a process for replacing the certificate for a server. For purposes of illustrating a clear example, the process of FIG. 4 is described below with reference to the example system of FIG. 1. However, FIG. 4 may be practiced using any other suitable network system.

In the context of FIG. 1, the process of FIG. 4 may involve replacing the certificates associated with a server 110 on the server 110 and a set of clients 101 with a new certificate obtained from a CA 120.

In block 410, a server obtains a new certificate from a CA. For example, a server 110 obtains a new certificate from a CA 120. In various embodiments, the certificate can also be obtained from other than the CA.

In block 420, the certificate on the server, if one exists, is replaced with the new certificate obtained form the CA. For example, a server 110 replaces its certificate with a new one that it has obtained form a CA 120.

In block 430, a certificate associated with the server for a set of clients needs to be updated with the server's new certificate. One way to accomplish updating the clients is to bring each client into a trusted domain and replacing the copy of the server's certificate on the client. For example, multiple clients 101 are brought into a trusted domain in order to replace the certificate associated with a server 110 with the new certificate for the server 110 obtained from the CA 120.

The steps described along with the associated steps described herein overcome the problem of obtaining updated status for a server's certificate when communication is attempted between a server and a client.

Updating the Client Certificate

There are many reasons that a certificate could be revoked for a server, including, expiration of the certificate, change of certificate authority, and compromise of the certificate. In any of these cases, the certificate needs to be replaced, as do the copies of the certificate resident on the clients.

Figure 5:
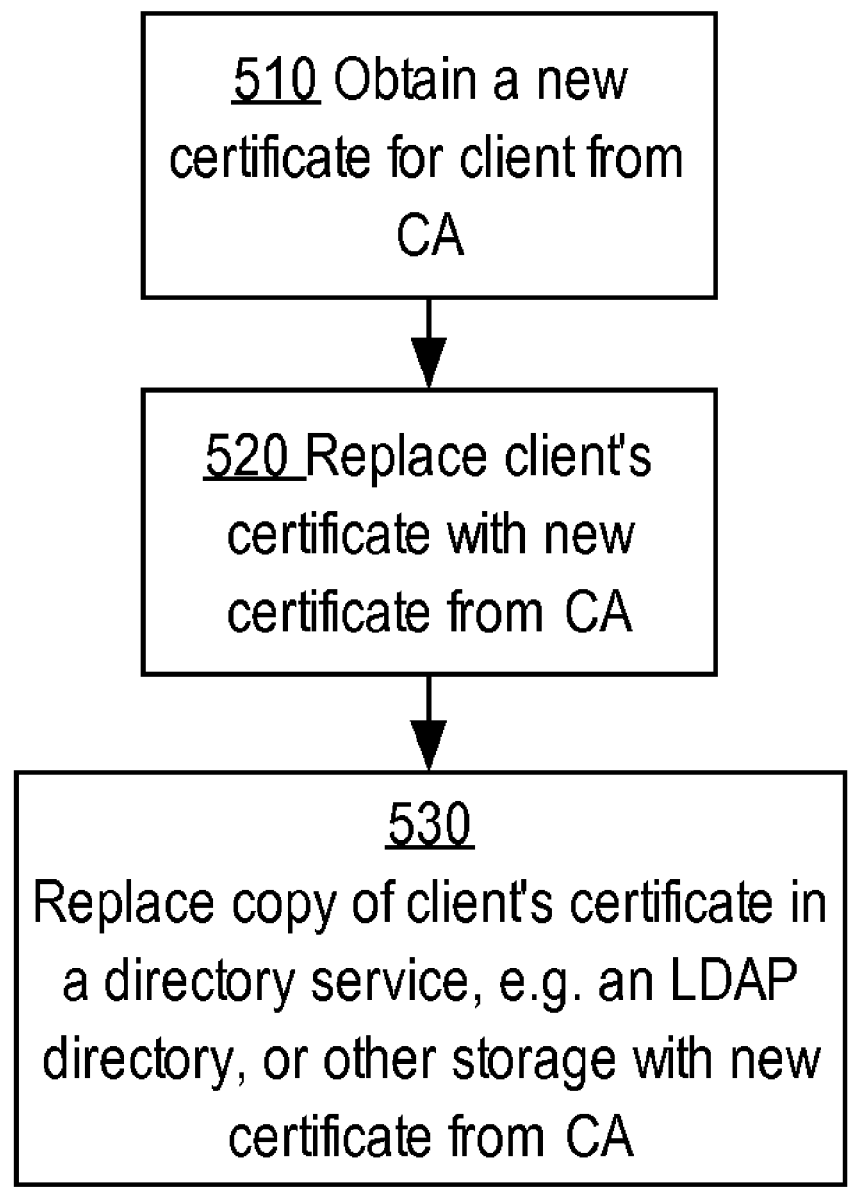
FIG. 5 is a flow diagram that depicts a process for replacing the certificate for a client.

FIG. 5 is a flow diagram that depicts a process for replacing the certificate for a client. For purposes of illustrating a clear example, the process of FIG. 5 is described below with reference to the example system of FIG. 1. However, FIG. 5 may be practiced using any other suitable network system.

In the context of FIG. 1, the process of FIG. 5 may involve replacing the certificates associated with a client 101 on servers 110 and the clients 101 with a new certificate obtained from a CA 120.

In block 510, a client obtains a new certificate from a CA. For example, a client 101 obtains a new certificate from a CA 120. In various embodiments, the certificate can also be obtained from other than the CA.

In block 520, the certificate on the client, if one exists, is replaced with the new certificate obtained form the CA. For example, a client 101 replaces its certificate with a new one that it has obtained form a CA 120.

In block 530, a certificate associated with the client is updated at the servers. In various embodiments, this involves replacing the copy of the certificate in a directory services, such as an LDAP directory, or other storage. For example, a server 110 can replace a certificate associated with a client 101 in its directory service 140. In various embodiments, this is done at every server that could serve the client.

The steps described along with the associated steps described herein overcome the problem of obtaining updated status for a client's certificate when communication is attempted between a server and a client.

Comparing Memory Representations

In order to obviate the need to be able to parse and execute on each potential format for incoming certificates and in order to avoid the need to keep track of which fields of the certificate to compare for which clients, servers, and other message senders, a novel method for comparing the certificates is introduced: comparing the memory representation of certificates. In binary computers, the memory representation of a data structure is a series of zeros and ones stores in either continuous or non-continuous memory. This memory representation can be used by computers and systems, along with the syntax for the data structure, to extract values from the data structure. In order to determine if two certificates are identical, however, the system does not necessarily need to know how to parse or interpret the data structure. Instead, the system can compare the zeros and ones of the digital certificates.

Figure 6:
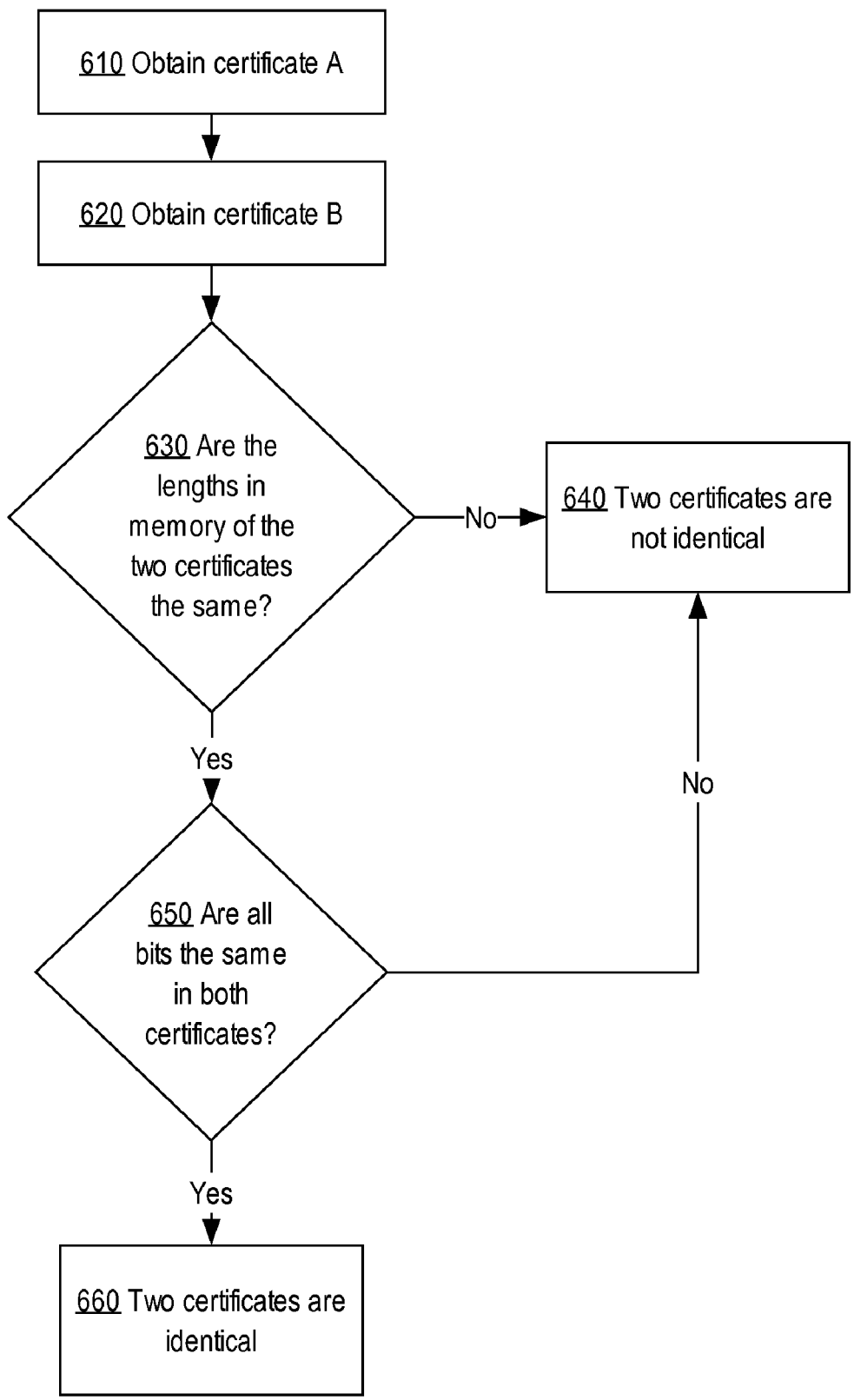
FIG. 6 is a flow diagram that depicts a process for comparing two certificates.

FIG. 6 is a flow diagram that depicts a process for comparing two certificates. The system must obtain certificate A, block 610, and certificate B, block 620. The system then compares the lengths in memory of the two certificates, block 630. If the two certificates have different lengths in memory, then the two certificates are marked as not identical, block 640. If the two certificates have the same length in memory, then the system performs a bit-by-bit comparison of the two certificates, block 650. If any of the bits differ, then the certificates are not identical, block 640. If all of the bits are identical, then the certificates are identical, block 660.

In order to put FIG. 6 in the context of FIG. 1, these certificates, A and B, could be associated with either a client 101 or a server 110. Also in the context of FIG. 1, the steps described in FIG. 6 could be performed on a client 101, a server 110, or both.

The benefit of the memory representation comparison is to reduce the necessity for format-specific resources. That is, since this comparison can be done independent of format, the code for implementing the system can be simpler and the expertise needed by the system implementers and administrators is reduced.

Load Balanced Servers

In particular embodiments, it is possible to have load balanced servers. One method to accomplish this is to have the certificate of each server be identical. In this way, the clients need not be aware by which of the servers it is being served. Since the certificates at the servers are identical, the process for verification of the servers is the same.

In the context of FIG. 1, multiple servers 110 could be load balanced across clients 101, and these servers 110 could have the same security certificate. In doing so, the clients 101 would perform the foregoing steps without knowing by which server 110, they are being served.

Implementation

Embodiments can be implemented in any manner appropriate to the system and allowing the functionality set forth in this disclosure and claims. In one embodiment, for example, the client has the foregoing steps programmed as a set of instructions running in a communication module, and the server has the foregoing steps programmed as a set of instruction in a dynamically linked library running as part of an authorization module on the server 110.

Figure 7:
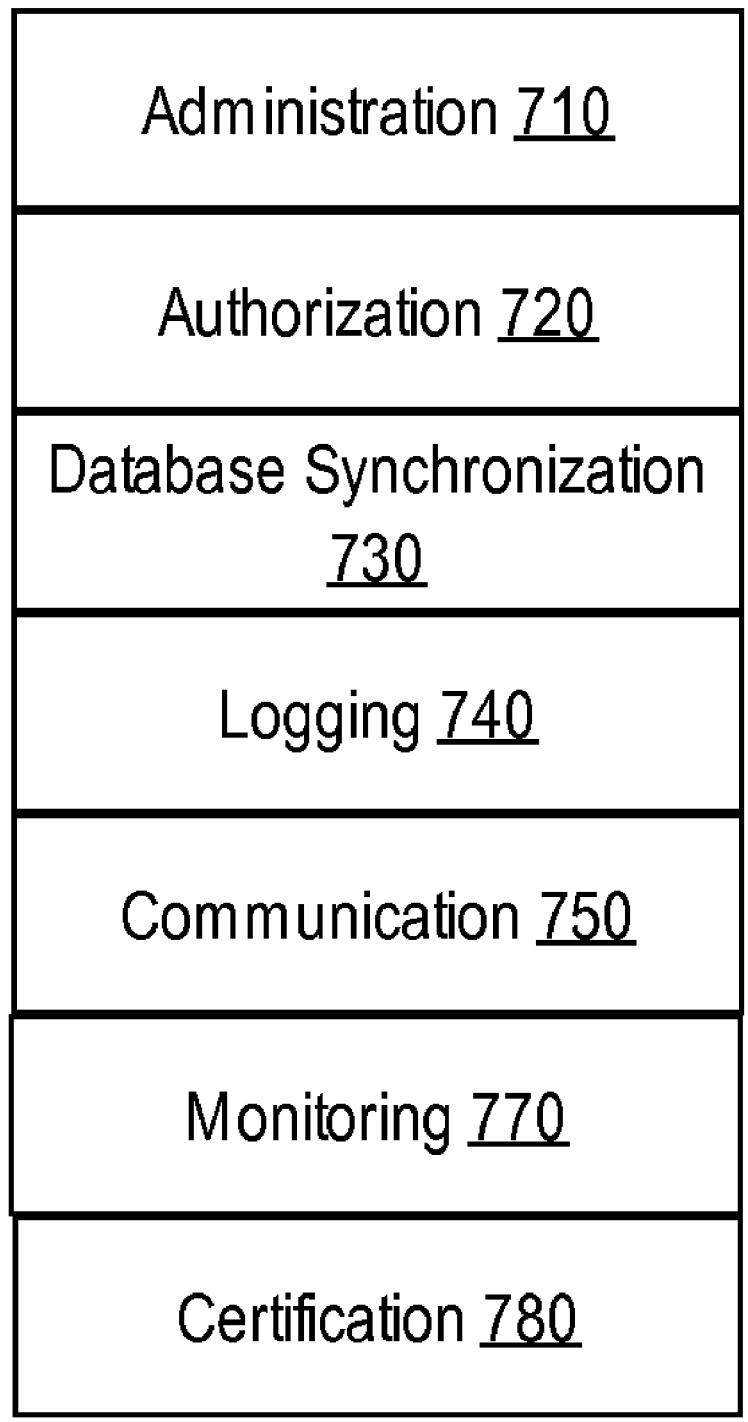
FIG. 7 is a block diagram that depicts an implementation on a server.

FIG. 7 depicts the functional architecture of a preferred embodiment of an AAA server including the current invention. In this server, there are multiple services. The administration service 710 provides a built-in web server for AAA administration of the multiple simultaneous sessions within the server. The authorization service 720 authenticates users, grants or denies service privileges, manages AAA databases, and handles external database authentication forwarding. The database synchronization service 730 manages database synchronization and replication to other AAA servers. The logging service 740 monitors and records user and administrator activities and activities related to backups and restoration, database replication, synchronizations, communication, VOIP activities, and any other service accounting needed. The communication service 750 handles communication and parsing of messages passed among devices and services. The monitoring service 770, monitors status of AAA services and server resources, records and reports all critical errors to logs, sends e-mail alerts to administrators noting any potential problems, automatically detects and restarts AAA services, and scrutinizes login frequency of users.

In one embodiment, the steps set forth run as part of the authorization service 720. In other embodiments, the steps set forth are integrated into another of these existing services, can run as a separate service 780, or can be a separate service, 780, but still use the current services.

Hardware Overview

Figure 8:
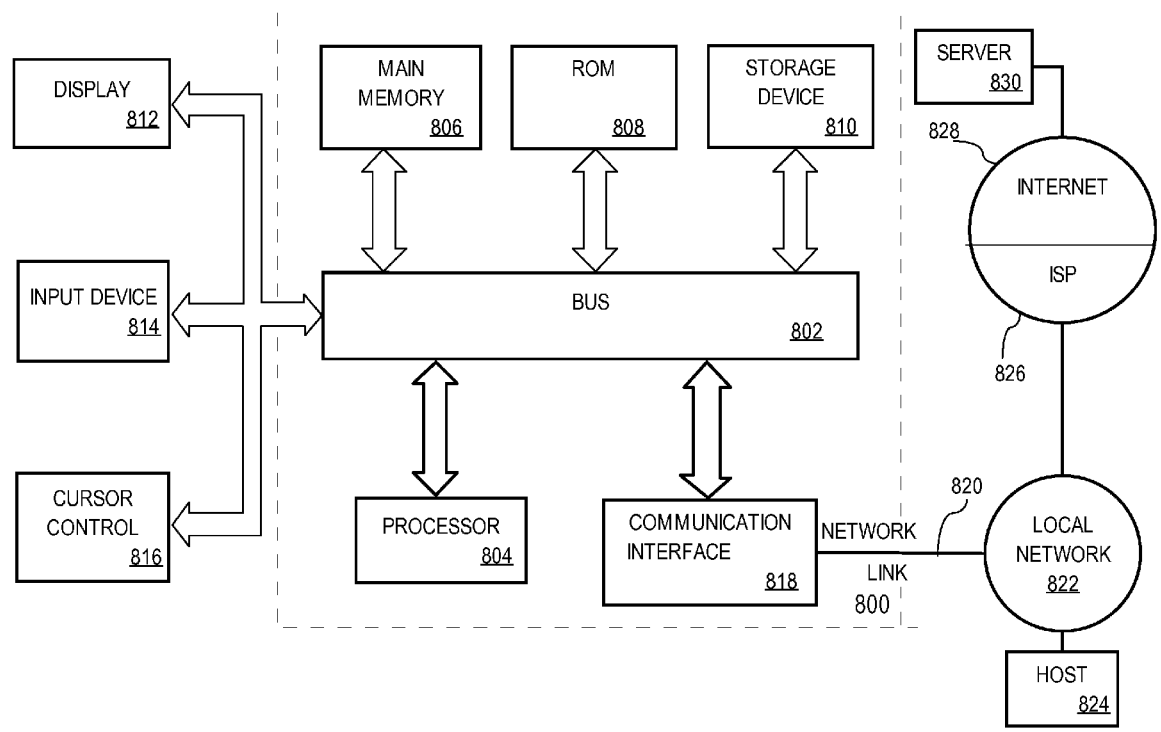
FIG. 8 is a block diagram of a computer system with which an embodiment may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is communicatively coupled to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-readable data storage medium storing sequences of instructions which when executed by one or more processors cause the one or more processors to perform:
   receiving a first security certificate associated with a server, and storing the first security certificate in a location accessible to a client of the server;
   updating the first security certificate in the location accessible to the client when the first security certificate is changed or revoked;
   receiving a second security certificate from the server when identity of the server needs to be verified;
   without parsing or interpreting any data structures in the first security certificate or the second security certificate, comparing in memory a binary representation of the entire second security certificate to a binary representation of the entire first security certificate without parsing of data fields contained within either the first or second security certificates;
   confirming the server's identity only when the comparing results in the second security certificate matching the first security certificate for the server.

2. The storage medium of claim 1, wherein the instructions for updating the first certificate comprise instructions which when executed cause removing the first certificate from the location accessible to the client when the first certificate is revoked; replacing the first certificate in the location accessible to the client when the first certificate is changed.

3. The storage medium of claim 2, wherein the instructions that cause removing are performed when the first certificate is known to have been revoked for a reason selected from the group consisting of expiration of the certificate, change of certificate authority, and compromise of the certificate.

4. The storage medium of claim 2, wherein the instructions that cause replacing are performed when the first certificate is known to have been changed for a reason selected from the group consisting of expiration of the certificate, change of certificate authority, and compromise of the certificate.

5. The storage medium of claim 1, wherein the instructions that cause comparing the two certificates comprise comparing a computer memory representation of each certificate.

6. The storage medium of claim 1, wherein the communication between the client and server is in a protocol that requires the inclusion of a digital certificate.

7. The storage medium of claim 1, wherein the second certificate is signed by a certificate authority.

8. The storage medium of claim 1, wherein the server is one of a plurality of load balanced servers and each server of the plurality of load balanced servers has an identical security certificate.

9. The storage medium of claim 1, further comprising instructions which when executed cause validating that the sender has a private key corresponding to a public key in server's security certificate, by receiving a message encrypted with the server's private key and decrypting the message using the server's public key.

10. The storage medium of claim 1 further comprising instructions which when executed cause comparing an occupied length in memory of the first security certificate to an occupied length in memory of the second security certificate before the confirming of the sender's identity.

11. A data processing apparatus, comprising:
    a network interface;
    one or more processors coupled to the network interface;
    computer-readable data storage medium storing sequences of instructions which when executed by one or more processors cause the one or more processors to perform:
    receiving a first security certificate associated with a server, and storing the first security certificate in a location accessible to a client of the server;
    updating the first security certificate in the location accessible to the client when the first security certificate is changed or revoked;
    receiving a second security certificate from the server when identity of the server needs to be verified;
    without parsing or interpreting any data structures in the first security certificate or the second security certificate, comparing in memory a binary representation of the entire second security certificate to a binary representation of the entire first security certificate without parsing of data fields contained within either the first or second security certificates;
    confirming the server's identity only when the comparing results in the second security certificate matching the first security certificate for the server.

12. The apparatus of claim 11, wherein the instructions for updating the first certificate comprise instructions which when executed cause removing the first certificate from the location accessible to the client when the first certificate is revoked; replacing the first certificate in the location accessible to the client when the first certificate is changed.

13. The apparatus of claim 12, wherein the instructions that cause removing are performed when the first certificate is known to have been revoked for a reason selected from the group consisting of expiration of the certificate, change of certificate authority, and compromise of the certificate.

14. The apparatus of claim 12, wherein the instructions that cause replacing are performed when the first certificate is known to have been changed for a reason selected from the group consisting of expiration of the certificate, change of certificate authority, and compromise of the certificate.

15. The apparatus of claim 11, wherein the instructions that cause comparing the two certificates comprise comparing a computer memory representation of each certificate.

16. The apparatus of claim 11, wherein the communication between the client and server is in a protocol that requires the inclusion of a digital certificate.

17. The apparatus of claim 11, wherein the second certificate is signed by a certificate authority.

18. The apparatus of claim 11, wherein the server is one of a plurality of load balanced servers and each server of the plurality of load balanced servers has an identical security certificate.

19. The apparatus of claim 11, further comprising instructions which when executed cause validating that the sender has a private key corresponding to a public key in server's security certificate, by receiving a message encrypted with the server's private key and decrypting the message using the server's public key.

20. The apparatus of claim 11 further comprising instructions which when executed cause comparing an occupied length in memory of the first security certificate to an occupied length in memory of the second security certificate before the confirming of the sender's identity.

21. The apparatus of claim 11 further comprising instructions which when executed cause copying the first certificate to a location accessible to the server; updating the first certificate in the location accessible to the server when the certificate is changed or revoked; sending the first certificate to the client when the identity of the server needs to be verified.

22. The apparatus of claim 21 further comprising comparing an occupied length in memory of the first security certificate to an occupied length in memory of the second security certificate before the confirming of the server's identity.

* * * * *